United States Patent

Grünwald et al.

[11] Patent Number: 5,690,745
[45] Date of Patent: Nov. 25, 1997

[54] APPARATUS FOR PLASMA TREATMENT OF THE INSIDE SURFACE OF A FUEL TANK

[75] Inventors: Heinrich Grünwald, Butzbach; Hermann Kloberdanz, Linsengericht; Roland Lacher, Gelnhausen; Siang-Hong Böll, Alzenau, all of Germany

[73] Assignee: Leybold AG, Hanau, Germany

[21] Appl. No.: 544,158

[22] Filed: Oct. 17, 1995

[30] Foreign Application Priority Data

Oct. 17, 1994 [DE] Germany .................. 44 37 050.4

[51] Int. Cl.$^6$ .................................................. C23C 16/00
[52] U.S. Cl. .................. 118/723 MW; 118/715; 118/723 MP; 118/50.1; 156/345; 315/111.21; 427/237; 427/238
[58] Field of Search .................. 118/715, 723 MW, 118/723 ME, 723 MP, 50.1, DIG. 10; 156/345; 315/111.21, 111.41; 427/230, 237, 238, 570, 575, 248.1

[56] References Cited

U.S. PATENT DOCUMENTS

| | | | |
|---|---|---|---|
| 4,261,806 | 4/1981 | Asai et al. | 204/165 |
| 4,668,479 | 5/1987 | Manabe et al. | 422/186.05 |
| 4,786,522 | 11/1988 | Fukuta et al. | 427/38 |
| 4,874,453 | 10/1989 | Fukuta et al. | 156/345 |
| 5,226,968 | 7/1993 | Ohmi et al. | 118/720 |
| 5,236,636 | 8/1993 | Tisack | 264/22 |
| 5,378,510 | 1/1995 | Thomas et al. | 427/563 |
| 5,468,295 | 11/1995 | Marantz et al. | 118/723 DC |
| 5,521,351 | 5/1996 | Mahoney | 219/121.59 |
| 5,565,248 | 10/1996 | Plester et al. | 427/571 |
| 5,591,267 | 1/1997 | Ohmi et al. | 118/715 |

FOREIGN PATENT DOCUMENTS

| | | |
|---|---|---|
| 250798 | 1/1988 | European Pat. Off. . |
| 3632748 A1 | 4/1988 | Germany . |
| 3908418 A1 | 9/1990 | Germany . |
| 3-107458 | 5/1991 | Japan . |

*Primary Examiner*—R. Bruce Breneman
*Assistant Examiner*—Jeffrie R. Lund
*Attorney, Agent, or Firm*—Felfe & Lynch

[57] ABSTRACT

A treatment chamber (1) evacuable by vacuum pumps (13,13') has a mounting (26,26',...) bearing the hollow body (4) in the treatment chamber (1), and a line (9,9') for the admission of a process gas into the treatment chamber (1). A microwave conductor (20,20' ...) is connected with a generator (19,19' ...) for igniting a plasma in the area of channels formed by a sheet-metal shroud (2,2') matching the configuration of the hollow body (4). A closure (7,7') is provided through which the filler opening (6, 6') of the hollow body (4) can be closed pressure-tight, and a line (9,9') for the process gas passes through the closure.

8 Claims, 2 Drawing Sheets

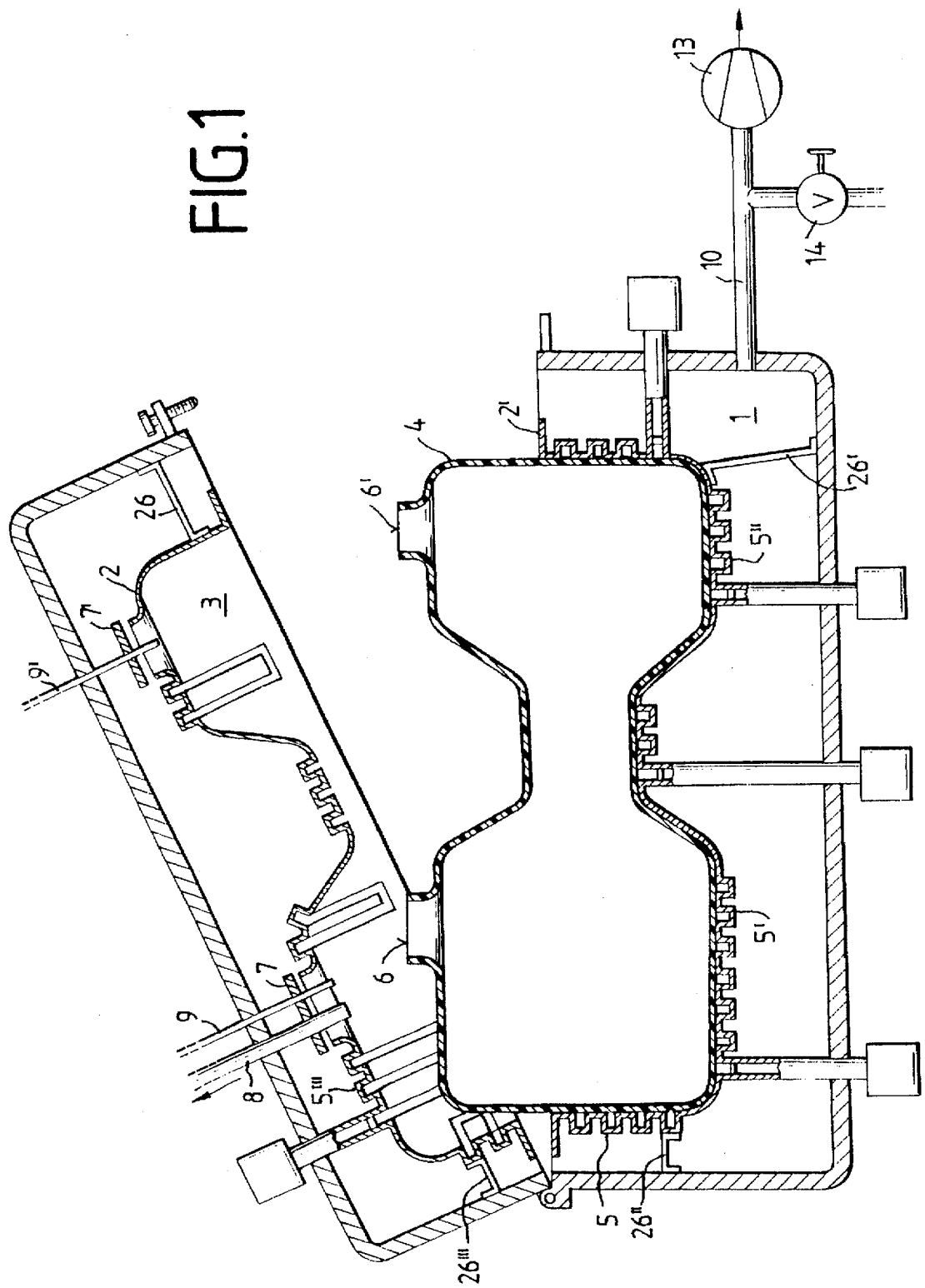

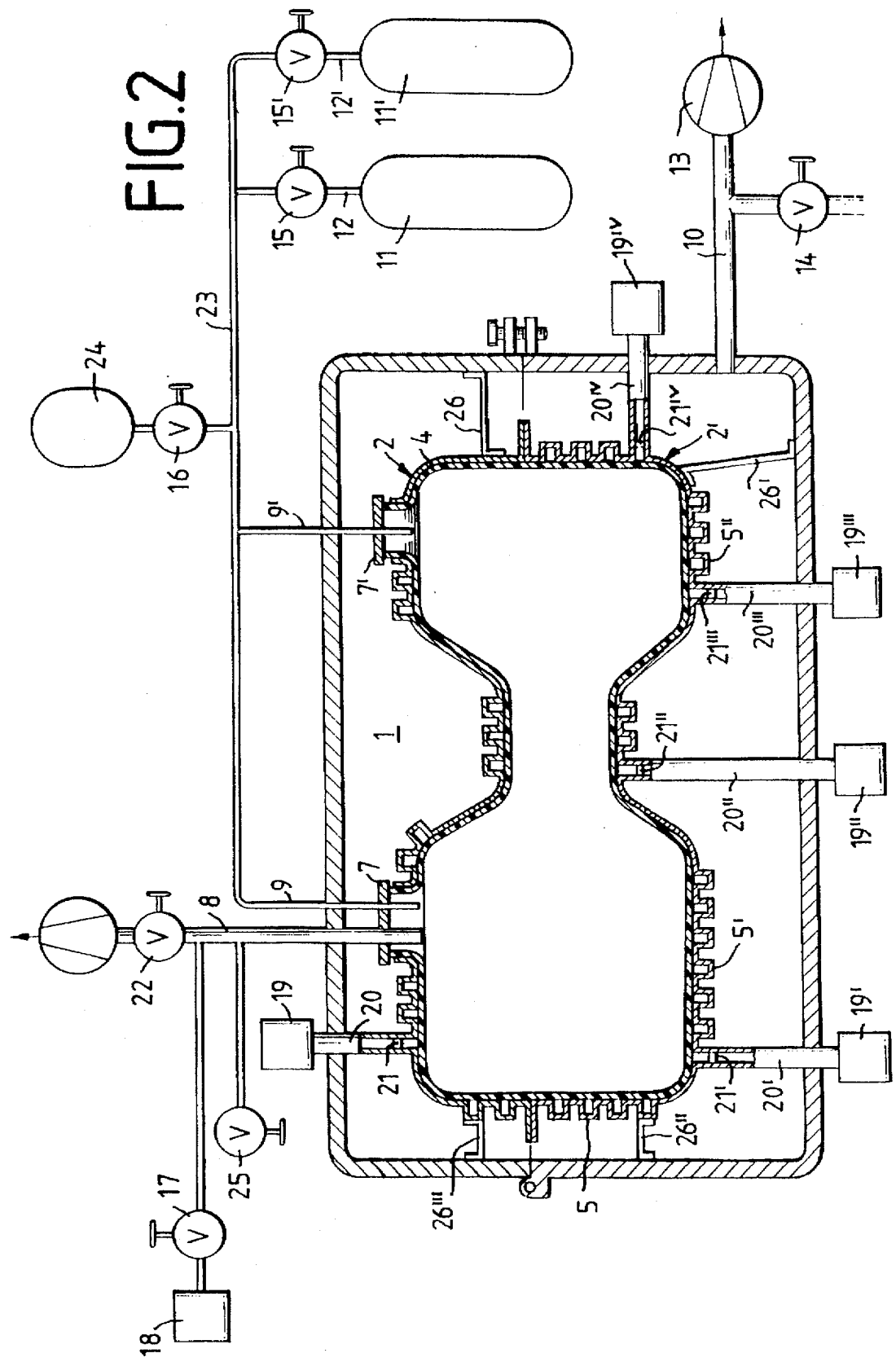

APPARATUS FOR PLASMA TREATMENT OF THE INSIDE SURFACE OF A FUEL TANK

BACKGROUND OF THE INVENTION

The invention relates to an apparatus for treating surfaces of hollow bodies, especially the interior surfaces of plastic fuel tanks, with a treatment chamber that can be evacuated by vacuum pumps, a mounting that bears the hollow body in the treatment chamber, with a conduit for the injection of a process gas into the treatment chamber, and with a microwave conductor connected to a generator for igniting a plasma in the range of the hollow body.

In plastic tanks there is generally the problem that their contents, especially those consisting of relatively small molecules, can migrate through the tank wall. This is undesirable especially when the contents are harmful or expensive, or the nature of the contents remaining in the tank is altered by the loss of some of its components. The latter is the case, for example, with aromatic substances.

One especially forward-looking process for the production of suitable blocking coatings is plasma polymerization, since it enables the deposit of permeation-resistant, but at the same time very thin plastic coatings in the interior of the container. This results not only in the needed blocking action but also in easy recyclability of the container material. One special advantage over the fluoridation processes in use at the present time is the fact that no dangerous substances (such as fluorine) need to be used.

A method for the interior plasma-coating of hollow bodies is known (German Pat. 36 32 748) in which microwaves are fed from the outside into the tank to produce the plasma, so that a uniform microwave field is produced inside of the plasma reactor. It is known in the technical field, however, that precisely the production of a uniform microwave field in technically significant cavities, fuel tanks, for example, is a special problem.

Also known (German Pat. 39 08 418) is an apparatus for the interior coating of plastic containers, whereby a plasma is excited by a high-frequency voltage in the megahertz range, or 2.45 Ghz, i.e., microwaves. The high frequency is here fed into the plastic container through a hollow probe. But even the stated hollow probe cannot be expected to produce a uniform high-frequency or microwave field, especially in fuel tanks of complex shape.

Lastly, a method is known (JP 3,107,458) for the internal coating of plastic tanks wherein a plasma is generated inside of the tank by means of a high-frequency voltage applied to two electrodes introduced into the tank, and is used for a preliminary treatment and a subsequent polymerization.

Common to the above-described apparatus is the disadvantage that they offer no possibility of achieving a plasma with a uniform coating action, nor for any quick check on the coating quality, especially its permeation blocking action. This disadvantage is all the greater since the permeation of substances through the container is becoming constantly lower in the case of fuel tanks, and on the other hand months of time are involved in determining such permeation in test chambers constructed precisely for that purpose.

SUMMARY OF THE INVENTION

The invention is addressed to the problem of creating an apparatus which permits a highly uniform distribution of the excitation energy for the plasma, thereby satisfying an important basic requirement for the deposit of a coating of uniform properties, such as thickness. The apparatus is also to make it possible to test the impermeability of each container with a minimum of time and expense. In addition, the apparatus is to be usable in "just in time" production with a minimum of preparation.

This problem is solved by a sheet-metal shroud which is adapted to the shape of a hollow body provided with a filler opening and envelops it, channels being incorporated or embossed into the sheet-metal shroud. Together with the wall of the hollow body under them, the channels form a hollow conduit which can be connected to the microwave generator through a microwave conductor. The pipe for the process gas is introduced into the interior of the hollow body, and a closure or stopper is provided by which the filler opening of the hollow body can be stopped in a pressure-resistant manner.

BRIEF DESCRIPTION OF THE DRAWINGS

FIG. 1 is a longitudinal section of the open vacuum chamber; and

FIG. 2 is a longitudinal section of the closed vacuum chamber.

DETAILED DESCRIPTION OF THE PREFERRED EMBODIMENT

In FIG. 1, a hinged vacuum chamber 1 is lined with at least two shell-like pans 2, 2', such that a cavity 3 surrounded by both sheet-metal pieces has substantially the same configuration as the fuel tank 4 that is to be coated. Meandering channels 5, 5', 5", 5''' with a rectangular profile are created in the surface of the sheet-metal pans 2, 2', and the microwaves for producing a plasma are fed through them and can be distributed over the inside surface of the cavity. The pans 2, 2', are so disposed and fixed that the cavity 3 they surround is opened when the vacuum chamber 1 is opened and thus becomes accessible for the insertion of the tank 4. In the vacuum chamber 1, on the pans 2, 2', there are stoppers 7, 7', for the rapid blocking of the various openings 6, 6', of the tank 4, and they are preferably configured so that the openings 6, 6', are closed automatically when the vacuum chamber 1 is closed, thus separating the interior of the tank 4 from the interior of the vacuum chamber 1. Depending on the number and arrangement of the openings 6, 6', at least one of the closures or stoppers 7, 7', is configured such that it simultaneously permits the injection and exhaustion of reaction gas, while the vacuum line 8 and gas injection line 9 or 9' will have no connection to the interior of the vacuum chamber 1. The vacuum chamber 1 is in turn connected by a separate vacuum line 10 to a vacuum pump set 13 as well as a venting valve 14. The reaction gas or reaction gas mixture is taken from one or more gas or liquid tanks 11 and 11' and fed through a conduit 12 12', to the tank interior. To control the feed of the reaction gas, at least one control valve 15, 15' is provided. The gas line 9, 9', is connected through a valve 16 to a line for helium 24 and vacuum line 10 is connected through a valve 17 to a helium detector 18. The microwave supply is produced by magnetrons 19, 19', . . . with a working frequency of 2.45 Ghz, which are connected each by a hollow conductor 20, 20', . . , to a coil-like or winding indentation or pattern 5, 5', . . . The interior of the hollow conductors 20, 20', . . . is shut off gas-tight by quartz plates 21, 21' . . . which are set in the indentations 5, 5', . . . , so that even when vacuum is created in the vacuum chamber 1, atmospheric pressure will prevail inside of the hollow conductor 20.

The apparatus is operated in the following manner:

First a set of sheet-metal pans 2 adapted to the shape of tank to be coated is inserted into the open vacuum chamber 1, and the magnetrons 19, 19', . . . are connected by the hollow conductors 20, 20' . . . to the indentations 5, 5', . . . . Then the plastic tank 4 to be coated is installed and its openings 6, 6', are closed by the stoppers 7, 7', simultaneously with the closing of the vacuum chamber 1, and they are thus cut off gas-tight from the interior of the vacuum chamber 1. Then the interior of the tank 4 and the interior of the vacuum chamber are evacuated simultaneously through the vacuum lines 8 and 10. After a predetermined external pressure is reached within the cavity 3, but outside of the tank 4, the pump line 10 is closed by a valve and thus this pressure is retained. The level of the external pressure is to be selected such that the tank is not appreciably deformed by the pressure difference between the pressure inside of the tank and the external pressure. On the other hand, it must be sufficiently high so that, when the plasma is later ignited inside of the tank 4, a plasma will be prevented from forming also inside of chamber 1, and especially inside of the coil-like indentations 5, 5', . . . . In case an unwanted plasma outside of the tank 4 cannot be reliably suppressed due to an excessively low differential pressure, the cavity 3 outside of the tank must be filled at least partially with a material which does not absorb microwaves. For this purpose a dieletric material with a large surface, such as glass fibers, is preferred. The interior of the tank is further evacuated down to a residual pressure of, for example, 0.001 mbar. Then the reactive gas or gases used for the coating are delivered from the tanks 11, 11', through the gas line 12, 12', and the valve or valves 15, 15', into the tank 4. After a predetermined process pressure between about 0.005 and 0.8 mbar has been stabilized, a plasma is generated by turning on the magnetrons 19, 19', . . . and it is maintained for a predetermined processing time. The microwaves emitted from the magnetron are radiated into the container 4 through the winding indentations 5, 5', . . . , so that inside of the tank 4 a plasma is produced with a largely uniform energy density along the inside wall.

To further improve the uniformity of the coating, it is recommended that the microwave feed be pulsed at a frequency between 20 and 200 Hz via the power supply of the magnetrons 19, 19', . . . . Alternatively, or additionally, the input of reactive gas (mixture) into the tank, or the output from the tank, can be pulsed by an appropriate apparatus (not shown) installed in the gas line 23 or vacuum line 8, e.g., a controlled throttle valve or a rotating shutter. This is an advantage over pulsing the magnetrons 19, 19', . . . inasmuch as the plasma is continuously sustained and any lowering of the coating rate and permeation resistance of the coatings between pulses is prevented. It is to be noted in this case, however, that the pressure variations thus caused must be in the pressure range within which the generation will be stable and economical. The pulsing will reduce differences in the concentration of reactive particles within the plasma that are necessary for the coating.

After the processing time has ended the magnetrons 19, 19', . . . are shut off, the reaction gas feed is stopped, and evacuation is continued down to a residual pressure of about 0.001 mbar. Immediately thereafter, the vacuum line 8 is shut off by a valve 22 and helium from tank 24 is let into the tank 4 through gas line 23. At the same time the vacuum chamber 1 is again evacuated through the now-reopened vacuum line 8. After a predetermined time of stay of 10 minutes the partial pressure of the helium penetrating the tank wall is measured with the helium sensor 18, the helium leakage rate is determined, and thus the permeation-blocking action of the coating is expressed for quality control. Then the gas line 23 as well as vacuum lines 8 and 10 are closed by valves, and the vacuum chamber 1 and tank 4 are relieved through the venting valves 14 and 25. After the vacuum chamber 1 is opened and the tank cover of the pan 2 is swung to the position represented in FIG. 1, the coated tank 4 is removed.

In a preferred embodiment, the wall of the vacuum chamber 1 is connected by an additional gas line through a valve, through which a plasma-inhibiting gas is admitted, i.e., one in which, under these conditions, a plasma is difficult to ignite. Such plasma-inhibiting gases are those having electro-negative, preferably comparatively larger molecules, such as sulfur hexafluoride, for example, or those with a greater free travel length in a vacuum, such as hydrogen for example. The pressure of the plasma-inhibiting gas is adjusted so that a plasma can no longer be ignited between the outside of the tank and the shell-like sheet metal pans 2, 2'. This pressure depends on the nature of the plasma-inhibiting gas and the maximum distance between the outside wall of the tank and the pans 2 and 2', and as a rule it ranges around 5 to 10 mbar.

What is claimed is:

1. Apparatus for treating the inside surface of a hollow body having opening means therein, said apparatus comprising a vacuum chamber, shroud means located in said vacuum chamber and conforming to the shape of a hollow body received therein, said shroud means being provided with channel means which cooperate with said hollow body to form closed conduit means and opening means which align with the opening means of said hollow body, closure means for closing the opening means of said shroud gas tight, means for introducing a process gas into said hollow body, and means for introducing microwaves into said closed conduit means.

2. Apparatus as in claim 1 wherein said channel means meander over the surface of a hollow body received in said shroud.

3. Apparatus as in claim 1 further comprising a plurality of microwave sources, said channel means cooperating with said hollow body to form a plurality of closed conduits, each microwave source being connected to a respective closed conduit.

4. Apparatus as in claim 1 wherein said means for introducing microwaves comprises at least one microwave conduit having a quartz glass window therein which serves as a pressure cut-off.

5. Apparatus as in claim 1 wherein said means for introducing said process gas passes through said closure means.

6. Apparatus as in claim 1 wherein said vacuum chamber comprises first and second chamber parts and said shroud means comprises first and second shroud parts, said first part of said shroud being fixed to said first part of said chamber, said second part of said shroud being fixed to said second part of said chamber, said parts being arranged so that said shroud is closed when said chamber is closed.

7. Apparatus as in claim 1 further comprising first vacuum means connected through said opening means to the inside of said shroud means for maintaining the inside of said hollow body at a first pressure, and second vacuum means connected to the inside of said vacuum chamber which is outside of said shroud means for maintaining said vacuum chamber at a second pressure.

8. Apparatus as in claim 1 further comprising means for introducing helium into said hollow body and means for detecting pressure of helium in said vacuum chamber outside of said hollow body, whereby said hollow body can be tested for leakage after said surface treatment.

* * * * *